(12) United States Patent
Uehara et al.

(10) Patent No.: US 8,064,010 B2
(45) Date of Patent: Nov. 22, 2011

(54) LIQUID CRYSTAL DISPLAY DEVICE

(75) Inventors: Toshinori Uehara, Tottori (JP); Koji Yoshida, Tottori (JP); Shuhei Yoshida, Tottori (JP)

(73) Assignee: Sony Corporation, Tokyo (JP)

( * ) Notice: Subject to any disclaimer, the term of this patent is extended or adjusted under 35 U.S.C. 154(b) by 399 days.

(21) Appl. No.: 12/423,336

(22) Filed: Apr. 14, 2009

(65) Prior Publication Data

US 2009/0273746 A1 Nov. 5, 2009

(30) Foreign Application Priority Data

Apr. 30, 2008 (JP) ................................. 2008-118146
Aug. 19, 2008 (JP) ................................. 2008-210318

(51) Int. Cl.
*G02F 1/1335* (2006.01)
(52) U.S. Cl. ....................................... 349/106; 349/107
(58) Field of Classification Search .................. 349/106, 349/107, 113, 114, 117, 119, 128, 130, 137
See application file for complete search history.

(56) References Cited

U.S. PATENT DOCUMENTS

| | | | |
|---|---|---|---|
| 6,281,952 B1 * | 8/2001 | Okamoto et al. ................ | 349/12 |
| 6,753,939 B2 * | 6/2004 | Jisaki et al. .................... | 349/114 |
| 7,030,948 B2 * | 4/2006 | Fujimori et al. ............... | 349/114 |
| 7,381,505 B2 * | 6/2008 | Kazuyoshi ...................... | 430/7 |
| 7,675,589 B2 * | 3/2010 | Kurasawa ....................... | 349/106 |
| 2001/0043302 A1 * | 11/2001 | Inoue et al. .................... | 349/137 |
| 2002/0075441 A1 * | 6/2002 | Fujimori et al. ............... | 349/155 |
| 2005/0105023 A1 * | 5/2005 | Kim et al. ...................... | 349/114 |
| 2005/0237450 A1 * | 10/2005 | Hu et al. ........................ | 349/108 |
| 2007/0008466 A1 * | 1/2007 | Horiguchi ...................... | 349/113 |
| 2007/0115405 A1 * | 5/2007 | Kazuyoshi ..................... | 349/107 |
| 2007/0182892 A1 * | 8/2007 | Higa et al. ..................... | 349/114 |

FOREIGN PATENT DOCUMENTS

JP 2006-267993 10/2006

* cited by examiner

*Primary Examiner* — Akm Ullah
(74) *Attorney, Agent, or Firm* — K&L Gates LLP

(57) ABSTRACT

A liquid crystal display device is provided which includes a substrate having a pixel electrode; and a color filter substrate having a color filter layer on a transparent substrate while having an alignment film formed on an uppermost layer thereof, the substrate and the color filter substrate each having a display region having a plurality of sub-pixels formed thereon, in which the color filter substrate has a liquid crystal layer thickness-adjustment layer formed of a transparent resin layer being partially formed on an inner side of the alignment film; and the liquid crystal layer thickness-adjustment layer has a trench being formed along and between adjacent ones of the sub-pixels, the bottom position of the trench of the liquid crystal layer thickness-adjustment layer being lower than a height of the color filter layer from a surface of the transparent substrate, and the transparent resin layer existing on the bottom of the trench.

10 Claims, 11 Drawing Sheets

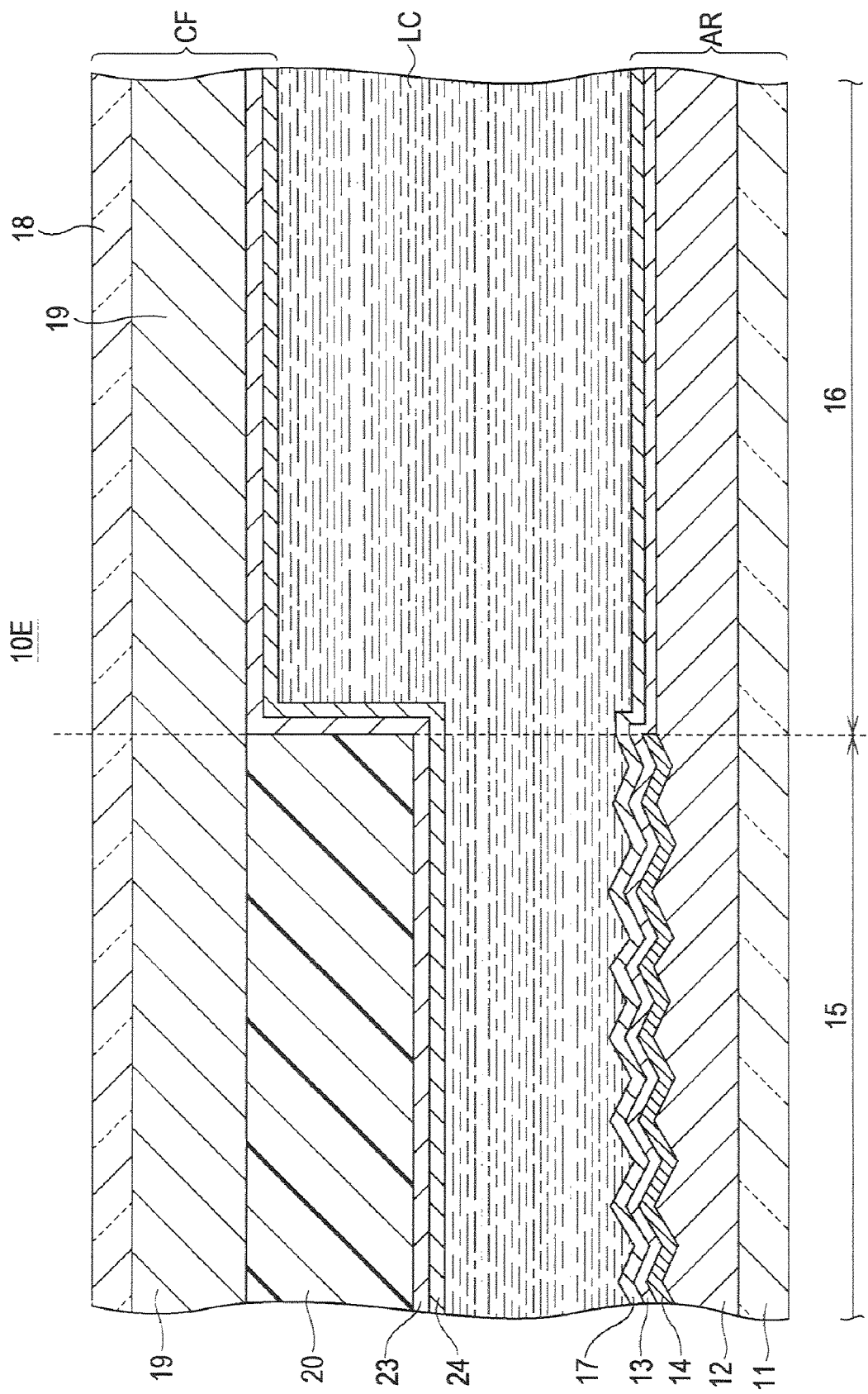

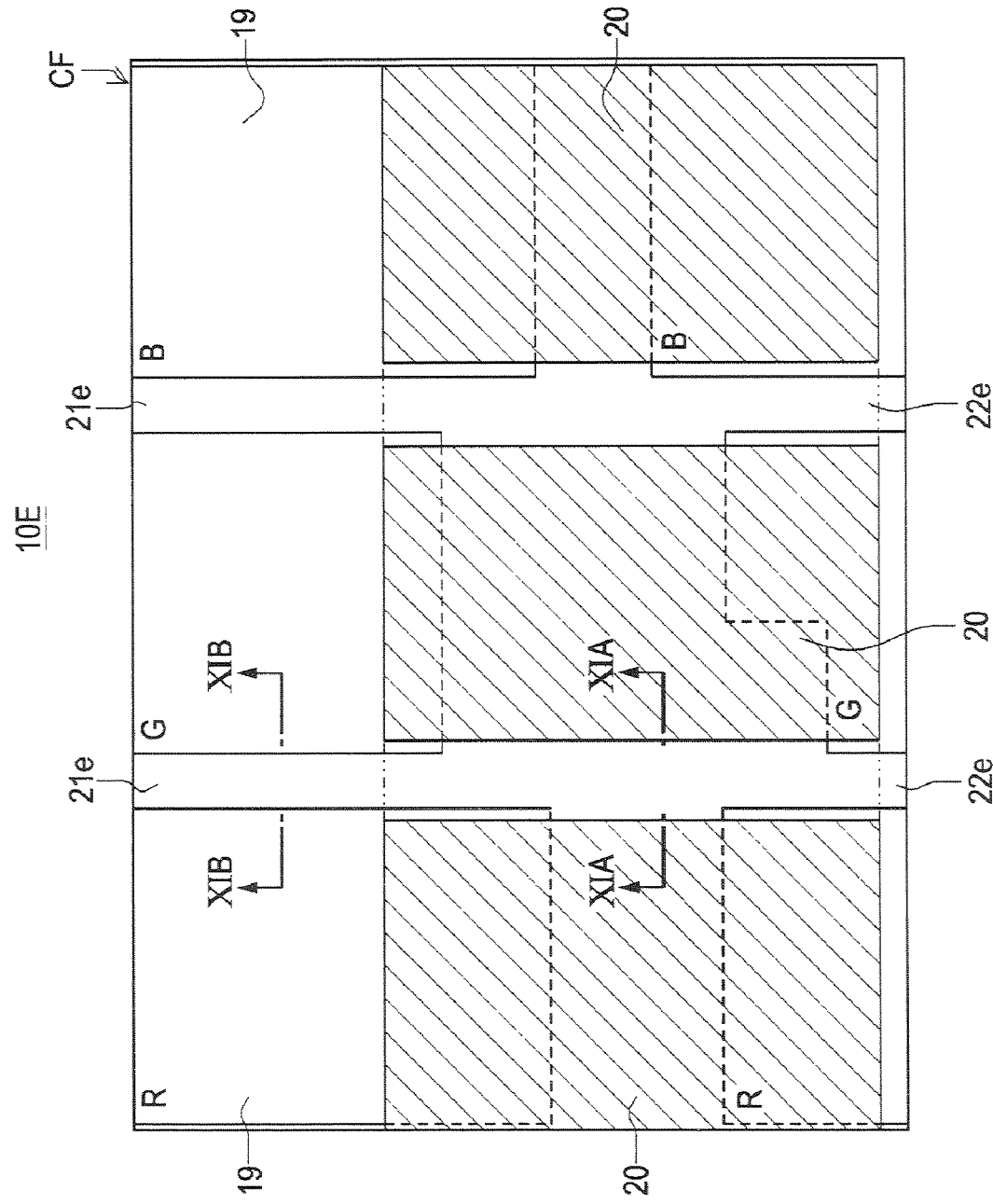

LIQUID CRYSTAL DISPLAY DEVICE

This application claims the benefit of Japanese Patent Application No. 2008-118146, filed on Apr. 30, 2008, and Japanese Patent Application No. 2008-210318, filed on Aug. 19, 2008. The entire disclosures of the prior applications are hereby incorporated by reference herein in their entirety.

BACKGROUND

1. Technical Field

The present invention relates to a liquid crystal display device, and more particularly, to a liquid crystal display device capable of achieving a good display quality, a high aperture ratio and a high display luminance even when a multi-gap layer (liquid crystal layer thickness-adjustment layer) formed of a transparent resin layer is provided on a color filter substrate.

2. Related Art

In recent years, as a liquid crystal display device used for portable apparatuses typified by cellular phones, a transflective type liquid crystal display devices employing both transmissive and reflective display modes has been widely used. The transflective type liquid crystal display device includes, within each pixel, a transmissive portion (transmissive region) having a transparent electrode and a reflective portion (reflective region) having a reflective layer. In a dark place, a backlight is turned on so that images are displayed using transmissive portions of individual pixels. On the other hand, in a bright place, images are displayed on reflective portions of the individual pixels using an external light without turning on the backlight. Therefore, since electronic apparatuses using the transflective type liquid crystal display device need not always turn on the backlight, an advantage can be obtained that the power consumption thereof can be reduced considerably.

The transflective type liquid crystal display device has an optical path difference between the reflective portion and the transmissive portion. This is because in the reflective display mode, light incident from the outside is emitted to the outside in a manner that it makes a round-trip in the liquid crystal panel, while in the transmissive display mode, light from an internal light source such as a backlight passes through the liquid crystal panel to be emitted to the outside. For the purpose of controlling the optical path difference, a method is generally performed in which a so-called multi-gap layer formed of a transparent resin layer is provided to the reflective portion of the transparent substrate so that an optical path in the reflective portion is adjusted by the multi-gap layer so that the length thereof becomes substantially equal to that of an optical path in the transmissive portion. In addition, in a general transmissive type liquid crystal display device, a multi-gap layer formed of a transparent resin layer is often formed in order to protect the color filter layer and improve the flatness.

However, when such a multi-gap layer is formed, a step is formed in a boundary region of the reflective portion in which the multi-gap layer exists and the transmissive portion in which the multi-gap layer does not exist. Moreover, when an electrode, a color filter layer, a multi-gap layer, a common electrode, a light shielding film, and the like are formed on a transparent substrate, and an material for alignment film is then applied by a roller, a surplus material for alignment film may remain close to a boundary of the step between the reflective portion and the transmissive portion due to the multi-gap layer, and thus, thickness unevenness of the alignment film may occur. Therefore, in JP-A-2006-267993, there is disclosed a transflective type liquid crystal display device in which a trench is formed in a multi-gap layer for each sub-pixel so as to extend along a signal line thereby to form a pathway for a surplus material for alignment film so that the congestion of the material for alignment film is suppressed.

A transflective type liquid crystal display device disclosed in JP-A-2006-267993 will be described with reference to FIGS. 9 to 11. In the drawings below used in this specification for explanation purposes, individual layers or individual members are appropriately depicted with different reduced scales in order to make them large enough to be recognized on the drawings but not necessarily proportional to the actual size thereof.

FIG. 9 is a cross-sectional view of the transflective type liquid crystal display device disclosed in JP-A-2006-267993 corresponding to one sub-pixel. FIG. 10 is a fragmentary plan view of a color filter substrate of the transflective type liquid crystal display device disclosed in JP-A-2006-267993. FIG. 11A is a cross-sectional view taken along the line XIA-XIA in FIG. 10. FIG. 11B is a cross-sectional view taken along the line XIB-XIB in FIG. 10.

The transflective type liquid crystal display device 10E includes an array substrate (substrate) AR and a color filter substrate CF. The array substrate AR includes an interlayer film 12, which is formed as necessary on a transparent substrate 11 such as a glass substrate, and a pixel electrode 13 formed thereon. A reflecting plate 14 is provided at the boundary of the interlayer film 12 on the left side of FIG. 9 and the pixel electrode 13, and this left portion corresponds to a reflective portion (reflective region) 15. Moreover, a portion on the right side of FIG. 9 where the reflecting plate 14 is not provided corresponds to a transmissive portion (transmissive region) 16. Further, an alignment film 17 is formed on a surface of the pixel electrode 13. In FIG. 9, a switching element, a gate insulating film, a passivation film, and the like are not illustrated.

A color filter substrate CF is disposed so as to face an array substrate AR having the pixel electrode 13, a gap between the array substrate AR and the color filter substrate CF is defined, for example, by a columnar rib (not illustrated), and liquid crystals LC are filled between the substrates. In the color filter substrate CF, as illustrated in FIG. 10, color filter layers 19 corresponding to three colors of F (red), G (green) and blue (B) arranged in a stripe form are arranged on a transparent substrate 18, such as a glass substrate, close to the array substrate AR. Moreover, on the color filter substrate CF, a multi-gap layer (also referred to as an overcoat layer) 20 formed of a transparent resin with a predetermined width is provided to the reflective portion 15 in order to adjust a cell gap between the reflective portion 15 and the transmissive portion 16.

The color filter layers 19 of the three colors R, C and B are formed with a predetermined gap 21e between them. The multi-gap layer 20 is formed to be located across adjacent ones of the reflective portions 15. Furthermore, since the color filter layers 19 of the three colors R, C and B form one pixel (one pixel), a trench 22e with a predetermined width is formed in the multi-gap layer 20 for each pixel in a width direction thereof so as to reach the transparent substrate 11. The trench 22e extends along the gap 21e of the adjacent color filter layers 19 and has a width larger than the gap 21e. In FIG. 10, the line denoted by a two-dot chain line is the outline of the multi-gap layer 20 when the trench 22e is not formed. Since the multi-gap layer 20 is formed with a resist according to a well-known photolithographic method, the trench 22e is formed at the same time with this. On the surfaces of the multi-gap layer 20 and the color filter layers 19, a common electrode 23 and an alignment film 24 are sequentially formed.

Then, liquid crystals LC are filled between the color filter substrate CF and the array substrate AR with the color filter substrate CF being disposed to face the array substrate AR, whereby a transflective type liquid crystal display device 10E disclosed in JP-A-2006-267993 is obtained.

According to the above-described transflective type liquid crystal display device 10E, although due to presence of the multi-gap layer 20, a step is formed at a boundary region of the reflective portion 15 and the transmissive portion 16, because when an material for alignment film is applied by a roller, a surplus material for alignment film may spread into the trench 22e, thickness unevenness of the alignment film 24 does not occur. However, since the alignment direction of liquid crystal molecules by the alignment film 24 in the X part (see FIG. 11A) of the inclined surfaces of the trench 22e is different from the alignment direction in the flat part of the multi-gap layer 20, the X part becomes an abnormal alignment region of liquid crystal molecules, which is called a disclination. Therefore, although this part of the trench 22e is shielded by the light shielding film 25 similar to the gap 21e between the adjacent color filter layers 19, since this part does not contribute to display, there is a problem that the aperture ratio of the liquid crystal display device decreases. Such a problem is particularly so because the step of the trench 22e may increase in the case of a display panel configured to perform color display in a transmissive display mode and monochromatic display in a reflective display mode and having no color filter layer on the reflective portion. As a result, the display quality may deteriorate greatly compared with the case of a display panel configured to perform color display in both transmissive display mode and reflective display mode.

SUMMARY

The invention aims to solve at least part of the above-described problems and can be actualized as a form or an application described below.

Application 1 and 2

A liquid crystal display device, including: a substrate having a pixel electrode; and a color filter substrate having a color filter layer on a transparent substrate while having an alignment film formed as an uppermost layer thereof, a display region having a plurality of sub-pixels formed thereon, wherein:

the color filter substrate has a liquid crystal layer thickness-adjustment layer (multi-gap layer) formed of a transparent resin layer being partially formed so as to overlap with the plurality of sub-pixels; and the liquid crystal layer thickness-adjustment layer has a trench being formed along and between adjacent ones of the sub-pixels, the bottom of the trench of the liquid crystal layer thickness-adjustment layer being lower than a height of the color filter layer from a surface of the transparent substrate, and the transparent resin layer existing on the bottom of the trench.

In the liquid crystal display device according to Application 1, the bottom of the trench of the liquid crystal layer thickness-adjustment layer is partly flat.

According to such a configuration, when a trench is formed in a liquid crystal layer thickness-adjustment layer formed of a transparent resin layer so that a pathway for a surplus material for alignment film is constructed by the trench, the surplus one of the material for alignment film to be applied on the surface of the transparent resin layer can escape from both sides of the transparent resin layer. Therefore, according to the liquid crystal display device of the invention, it is possible to suppress the disorder of liquid crystal molecule alignment due to the step of the liquid crystal layer thickness-adjustment layer (multi-gap layer). Thus, occurrence of thickness unevenness of the alignment film can be suppressed, and so-called alignment defects such as distortion or non-uniformity of the alignment of the liquid crystal molecules can be reduced, whereby a liquid crystal display device having a good display quality can be obtained. In addition, when the bottom position of the trench of the liquid crystal layer thickness-adjustment layer is lower than the height of the color filter layer from the surface of the transparent substrate and the transparent resin layer exists on the bottom of the trench, the depth of the trench can be decreased compared with the known example. Therefore, it is possible to decrease the area of the inclined portion of the step due to the trench formed in the liquid crystal layer thickness-adjustment layer and to thus decrease the area of a disclination occurring region. Therefore, according to the liquid crystal display device of the invention, it is possible to obtain a liquid crystal display device having a high aperture ratio and a good display quality.

Application 3 and 4

In the liquid crystal display device according to Application 1, the sub-pixels has a color filter layer of different color in each sub-pixel, and the color filter layer has a predetermined gap between each sub-pixel, wherein the width of the trench is larger than the width of the gap.

In the liquid crystal display device according to Application 1, the color filter substrate has a light shielding film being formed so as to overlap with the trench formed in the liquid crystal layer thickness-adjustment layer in plan view.

According to such a configuration, the area of a portion of the trench formed in the liquid crystal layer thickness-adjustment layer to be shielded can be decreased compared with the known example. Therefore, according to the liquid crystal display device of the invention, it is possible to obtain a liquid crystal display device having a high aperture ratio and good contrast ratio.

Application 5

In the liquid crystal display device according to Application 2, the trench formed in the liquid crystal layer thickness-adjustment layer has a width smaller than that of the light shielding film.

According to such a configuration, when the width of the trench formed in the liquid crystal layer thickness-adjustment layer is smaller than the width of the light shielding film, it is possible to shield the entire portions of the trench formed in the liquid crystal layer thickness-adjustment layer. Therefore, according to the liquid crystal display device of the invention, it is possible to completely shield the disclination occurring region and thus to obtain a liquid crystal display device having a good display quality.

Application 6

In the liquid crystal display device according to Application 1, the liquid crystal display device further includes a plurality of pixels each being formed of the plurality of sub-pixels, wherein the trench formed in the liquid crystal layer thickness-adjustment layer is formed for each of the pixels.

According to such a configuration, in a liquid crystal display panel having, for example, color filter layers corresponding to three colors of R, Q and B, one pixel (also referred to as one pixel) is formed by three sub-pixels corresponding to respective colors R, G and B. When the trench formed in the liquid crystal layer thickness-adjustment layer is formed for each pixel, it is not necessary to form the trench in the liquid crystal layer thickness-adjustment layer for each of the sub-pixels. Thus, it is not necessary to form a light shielding member for each of the sub-pixels. Therefore, according to the liquid crystal display device of the invention, it is possible to obtain a liquid crystal display device having a high aperture ratio and a high display luminance.

Application 7

In the liquid crystal display device according to Application 1, the trench formed in the liquid crystal layer thickness-adjustment layer has sidewalls thereof having an inclination angle between 60 and 85 degree with respect to the transparent substrate.

According to such a configuration, when the inclination angle of the sidewalls of the trench formed in the liquid crystal layer thickness-adjustment layer with respect to the transparent substrate is equal to or smaller than 60 degree, the area of the alignment disorder region increases, and thus, it is not desirable. When the inclination angle is equal to or greater than 85 degree, the material for alignment film becomes hard to flow therein. The greater the inclination angle of the sidewalls of the trench formed in the liquid crystal layer thickness-adjustment layer with respect to the substrate, the easier it becomes to decrease the area of the sidewalls of the trench where alignment disorder is likely to occur. Thus, it is possible to decrease the area in plan view of the trench to be shielded. Therefore, according to the liquid crystal display device of the invention, it is possible to obtain a liquid crystal display device having a high aperture ratio and a high display luminance.

Application 8 and 9

In the liquid crystal display device according to Application 1, in each sub-pixel, the color filter layer is not disposed only in a part of the region where the liquid crystal layer thickness-adjustment layer is formed. In the liquid crystal display device according to Application 1, in each sub-pixel, the color filter layer is not disposed over the entire of the region where the liquid crystal layer thickness-adjustment layer is formed.

According to such a configuration, when a portion without the color filter layer is provided on a region on which the liquid crystal layer thickness-adjustment layer is formed, it is possible to adjust a difference in absorbance of the color filter layer for each color so that images can look natural to human eyes. Further, the portion without the color filter layer can be used for monochromatic display. Therefore, according to the liquid crystal display device of the invention, it is possible to obtain a liquid crystal display device capable of displaying with a wide range of color tone.

Application 10

In the liquid crystal display device according to Application 1, each of the plurality of sub-pixels includes a reflective region and a transmissive region, and the liquid crystal layer thickness-adjustment layer is formed in the reflective region.

According to such a configuration, since the liquid crystal layer thickness-adjustment layer is formed in the reflective region, it is possible to equalize the optical path length of the reflective portion and the transmissive portion so that an image displayed on the reflective portion has the same color tone as the image displayed on the transmissive portion. In addition, since the liquid crystal display device of the invention is able to perform monochromatic display in the reflective display mode, in this case, the image displayed on the reflective portion can be easily perceived.

BRIEF DESCRIPTION OF THE DRAWINGS

The invention will be described with reference to the accompanying drawings, wherein like numbers reference like elements.

FIG. 9 is a cross-sectional view of a known transflective type liquid crystal display device corresponding to one sub-pixel.

FIG. 10 is a fragmentary plan view of a color filter substrate of the known transflective type liquid crystal display device.

DESCRIPTION OF EXEMPLARY EMBODIMENTS

Figure 11A:
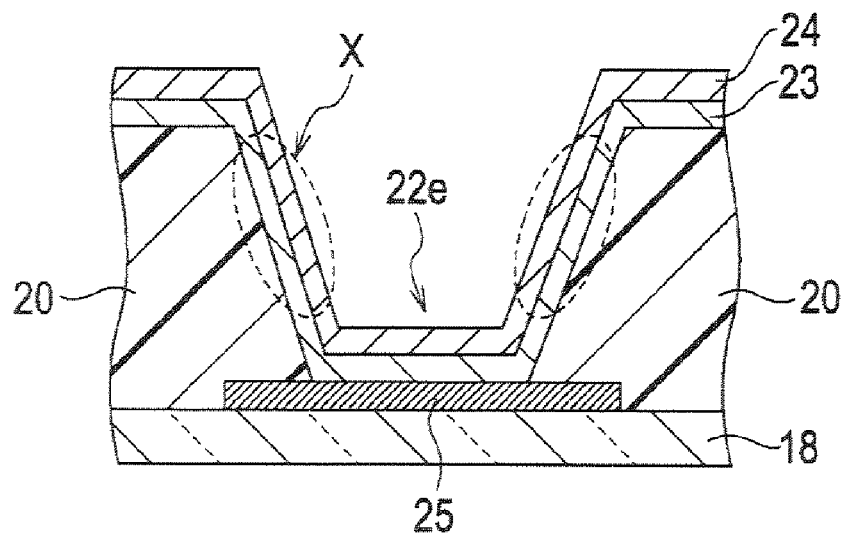
FIG. 11A is a cross-sectional view taken along the line XIA-XIA in FIG. 10.
Figure 11B:
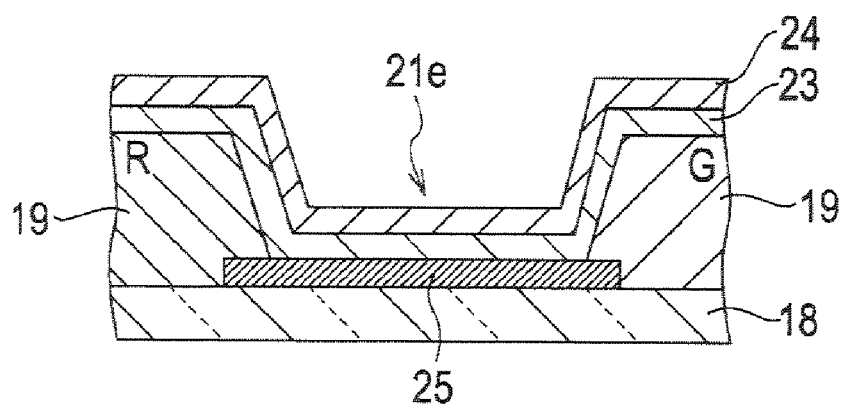
FIG. 11B is a cross-sectional view taken along the line XIB-XIE in FIG. 10.

Exemplary embodiments will be described herein below with reference to the accompanying drawings. The following embodiments are merely examples for embodying the invention and clarifying a technical spirit of the invention. This, however, is not intended to restrict the invention to the certain embodiments but other embodiments included in the claims are equally applicable to the invention. In the following descriptions, the same constituent elements as those of the known transflective type liquid crystal display device 10E illustrated in FIGS. 9 to 11 will be denoted by the same reference numerals. Moreover, since the array substrate (substrate) of the transflective type liquid crystal display device described in the following embodiments has the same configuration as that of the known liquid crystal display device illustrated in FIG. 9 except that the color filter layer is not formed in the reflective portion, detailed description thereof will be omitted.

First Embodiment

Figure 1:
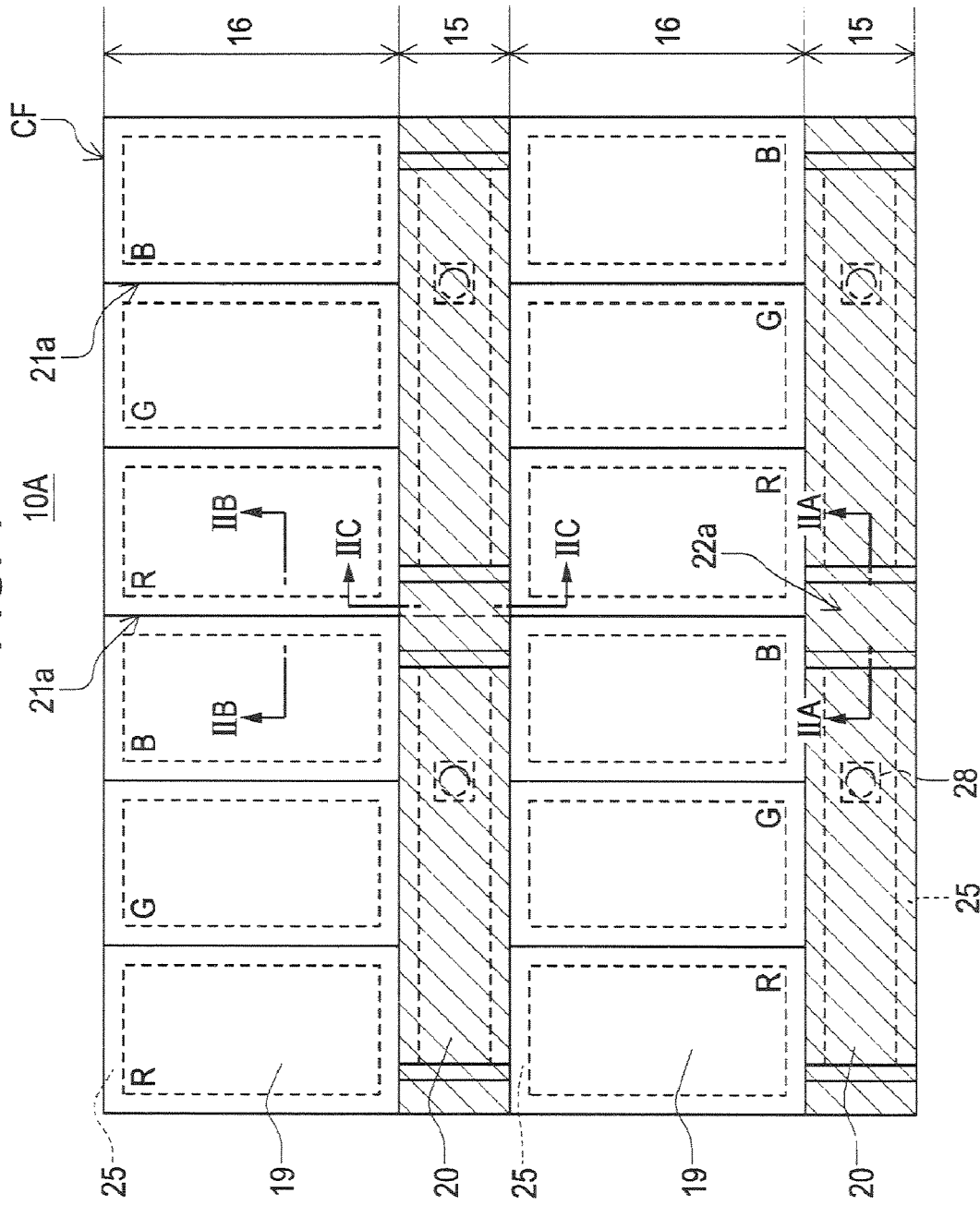
FIG. 1 is a schematic plan view of a color filter substrate of a transflective type liquid crystal display device according to a first embodiment, corresponding to four pixels.
Figure 2A:
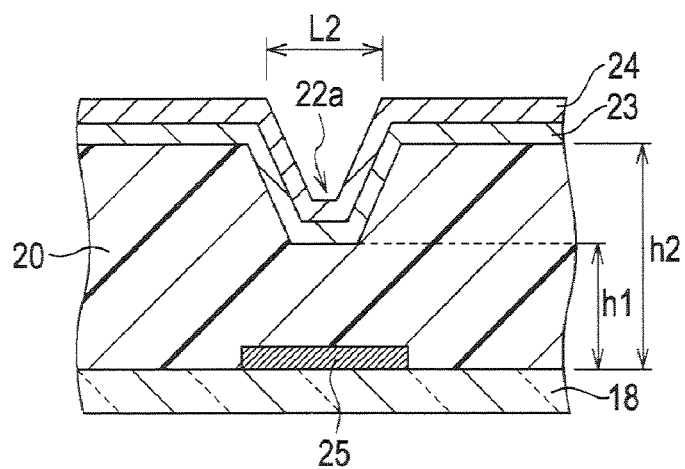
FIG. 2A is a cross-sectional view taken along the line IIA-IIA in FIG. 1.
Figure 2B:
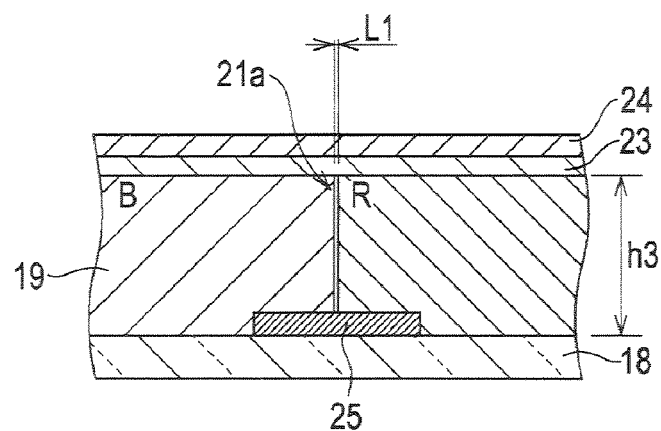
FIG. 2B is a cross-sectional view taken along the line IIB-IIB in FIG. 1.
Figure 2C:
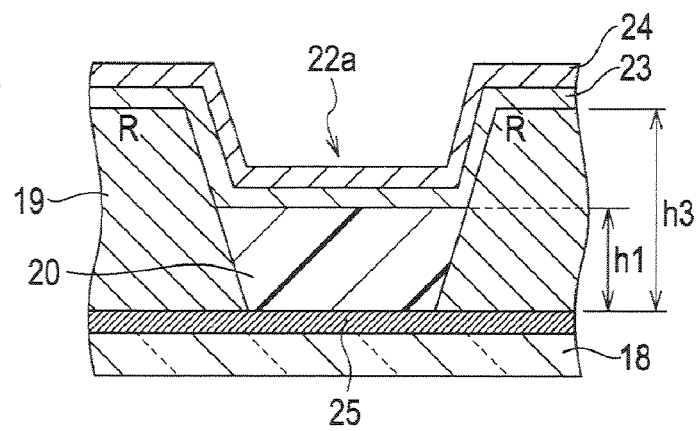
FIG. 2C is a cross-sectional view taken along the line IIC-IIC in FIG. 1.

FIG. 1 is a schematic plan view of a color filter substrate of a transflective type liquid crystal display device according to a first embodiment, corresponding to four pixels. FIG. 2A is a cross-sectional view taken along the line IIA-IIA in FIG. 1, FIG. 2B is a cross-sectional view taken along the line IIB-IIB in FIG. 1, and FIG. 2C is a cross-sectional view taken along the line IIC-IIC in FIG.

As illustrated in FIG. 1, in a color filter substrate CF of a transflective type liquid crystal display device 10A according to this embodiment, a reflective portion 15 for performing monochromatic display and a transmissive portion 16 having therein respective color filter layers 19 corresponding to colors R, G and B arranged in a stripe form are arranged in a matrix form. In the transflective type liquid crystal display device 10A having the color filter layers 19 corresponding to three colors of R, G and B, one pixel is formed by three sub-pixels corresponding to the colors of R, G and B. In addition, in the reflective portion (reflective region) 15, in order to adjust a cell gap between the reflective portion 15 and the transmissive portion (transmissive region) 16, a multi-gap layer (liquid crystal layer thickness-adjustment layer) 20 formed of a transparent resin with a predetermined width is provided in a direction intersecting the striped color filter layers 19 of the three colors. The color filter layers 19 of the three colors R, G and B are formed with a predetermined gap 21a between them (see FIG. 2B). The multi-gap layer 20 is formed to be located across adjacent ones of the reflective portions 15. Furthermore, since in this example, the color filter layers 19 of the three colors R, C and B form one pixel, a trench 22a with a predetermined width is formed for each pixel in a width direction thereof. It should be noted that the trench 22a with a predetermined width may be formed for each sub-pixel in a width direction thereof. In this way, a pathway of a surplus material for alignment film is formed, and thus, congestion of the material for alignment film is suppressed. A columnar spacer 28 functions as a spacer for separating the array substrate AR from the color filter substrate CF. Since the columnar spacer 28 can be disposed at any location with the optimum accuracy by a photolithographic method, it is possible to improve display performance compared with a case where beads-like spacers are sprayed. For example, the columnar spacer 28 is disposed on an extended line of a boundary of the color filter layers corresponding to G and B offset from the center of the reflective portion 15. With this, it is possible to obtain a uniform cell thickness in the reflective portion 15 and make the columnar spacer 28 hard to be seen.

The bottom of the trench 22a formed in the multi-gap layer 20 according to this embodiment is partly flat. As illustrated in FIGS. 2A and 2C, differently from the trench 22e formed in the multi-gap layer 20 of the known transflective type liquid crystal display device 10E, the bottom position of the trench 22a is lower than a height of the color filter layer 19 of the transmissive portion 16 from a surface of the transparent substrate 18, and a transparent resin layer exists on the bottom of the trench 22a. Here, a height of the bottom of the trench 22a of the multi-gap layer 20 from the surface of the transparent substrate 18 is defined as h1, a height of a top surface of the multi-gap layer 20 from said surface is defined as h2, and a height of the color filter layer 19 from said surface is defined as h3, respectively. Then, because the multi-gap layer 20 has a function of adjusting the cell gap between the reflective portion 15 and the transmissive portion 16, the multi-gap layer 20 needs to satisfy a relationship of h2>h3.

On the other hand, in the transflective type liquid crystal display device 10A according to this embodiment, the height h1 of the bottom of the trench 22a of the multi-gap layer 20 from the surface of the transparent substrate 13 is lower than the height h2 of the color filter layer 19 and satisfies a relationship of h3>h1. In addition, since the transparent resin layer exists on the bottom of the trench 22a, a relationship of h1>0 is satisfied. That is, in the transflective type Liquid crystal display device 10A according to this embodiment, a relationship of h2>h3>h0>0 is satisfied.

On the other hand, in the known transflective type liquid crystal display device 10E, since the transparent resin layer does not exist on the bottom of the trench 22e formed in the multi-gap layer 20 (see FIG. 11A), a relationship of h1=0 is satisfied. Therefore, when the condition of h2>h3>h1>0 is satisfied as in the case of this embodiment, it is possible to decrease the step of the trench 22a formed in the multi-gap layer 20 to be smaller than the step of the trench 22e of the known transflective type liquid crystal display device 1E. Accordingly, in accordance with the transflective type liquid crystal display device 10A according to this embodiment, particularly in a display panel configured to perform color display in a transmissive display mode and monochromatic display in a reflective display mode, it is possible to decrease the area of an inclined portion having the step due to the trench 22a formed in the multi-gap layer 20. Consequently, it is possible to decrease the area of a disclination occurring region and to thus obtain a liquid crystal display device having a good display quality.

Modification 1

Figure 3:
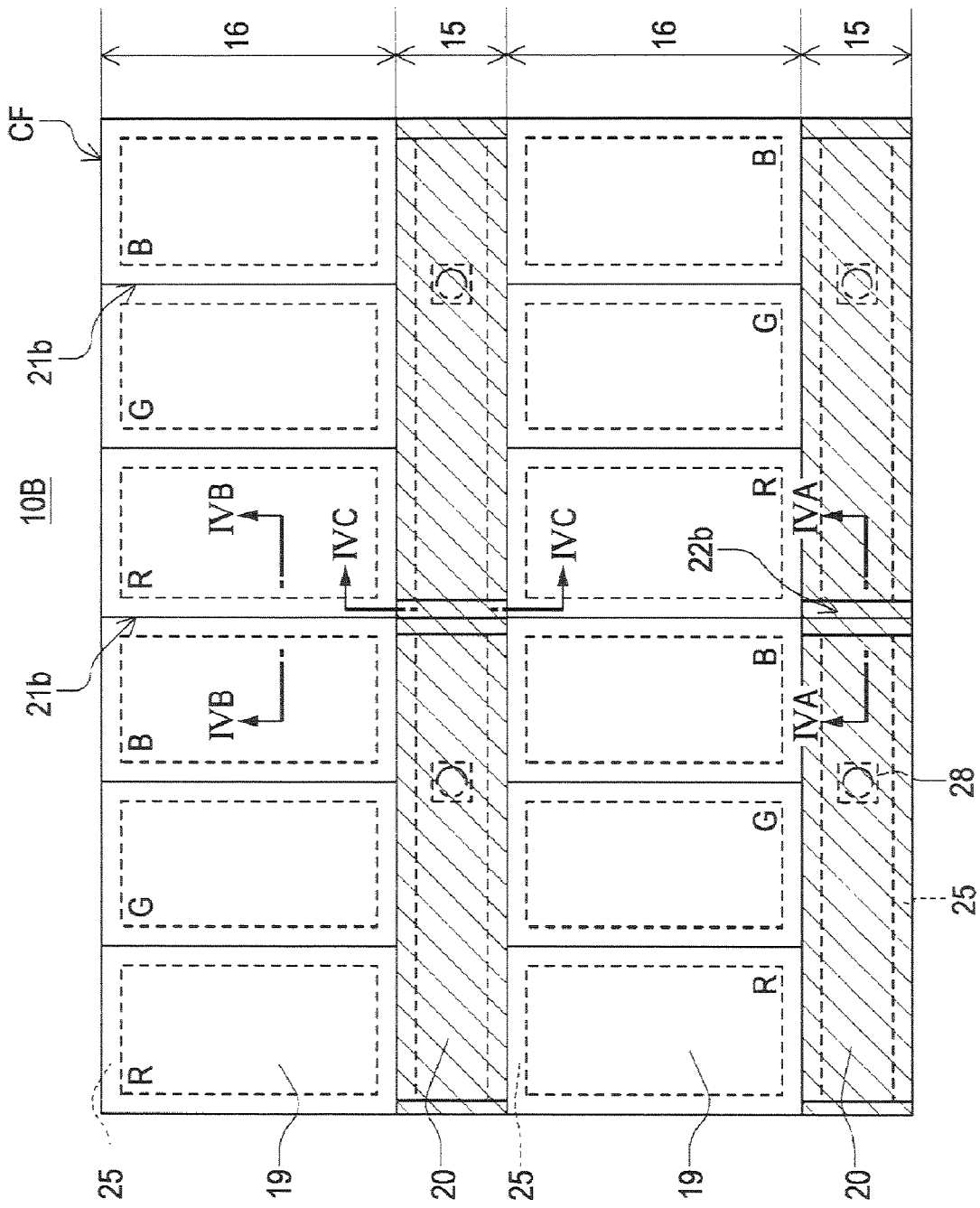
FIG. 3 is a schematic plan view of a color filter substrate of a transflective type liquid crystal display device according to Modification 1, corresponding to four pixels.
Figure 4A:
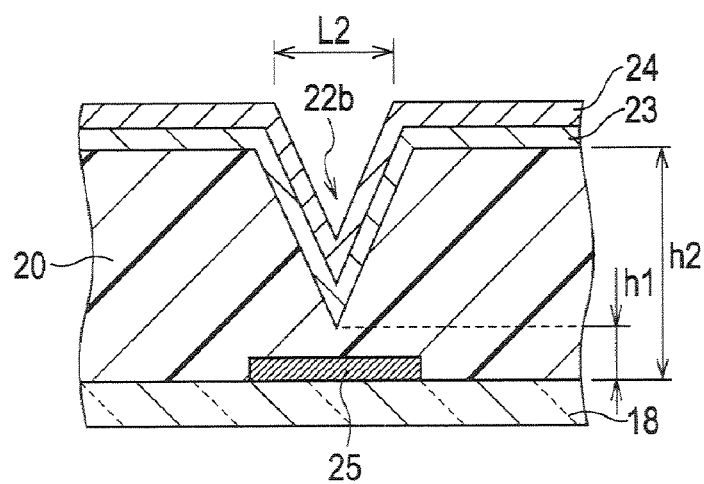
FIG. 4A is a cross-sectional view taken along the line IVA-IVA in FIG. 3.
Figure 4B:
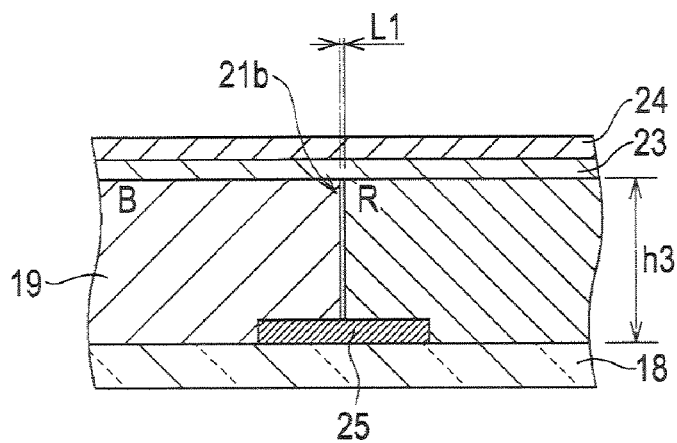
FIG. 4B is a cross-sectional view taken along the line IVB-IVB in FIG. 3.
Figure 4C:
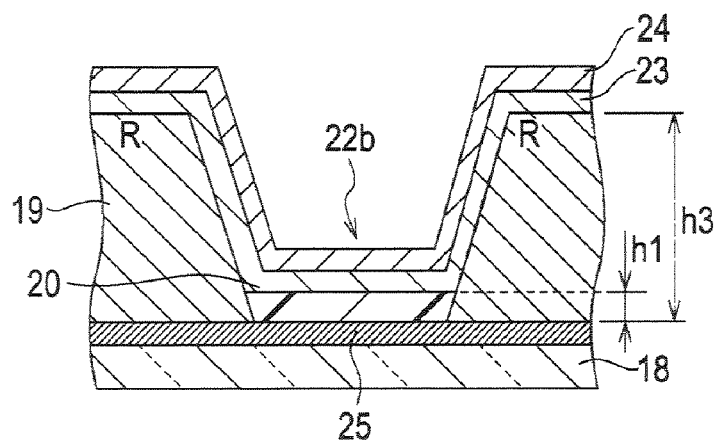
FIG. 4C is a cross-sectional view taken along the line IVC-IVC in FIG. 3.

Although the transflective type liquid crystal display device 10A according to the above embodiment has been described with respect to an example where the bottom of the trench 22a formed in the multi-gap layer 20 is partly flat in a row direction, the trench may have a V shape in cross-sectional view as long as the transparent resin layer exists on the bottom of the trench and the condition of h2>h3>h0>0 is satisfied. FIG. 3 is a schematic plan view of a color filter substrate of a transflective type liquid crystal display device according to this modification, corresponding to four pixels. FIG. 4A is a cross-sectional view taken along the line IVA-IVA in FIG. 3, FIG. 4B is a cross-sectional view taken along the line IVB-IVB in FIG. 3, and FIG. 4C is a cross-sectional view taken along the line IVC-IVC in FIG. 3. Since a transflective type liquid crystal display device 10B according to this modification has the same configuration as that of the transflective type liquid crystal display device 10A according to the above embodiment, except that a trench 22b formed in the multi-gap layer 20 has a V shape in cross-sectional view, the same constituent elements as those of the transflective type liquid crystal display device 10A according to the above embodiment will be denoted by the same reference numerals, and detailed description thereof will be omitted. In the case of the transflective type liquid crystal display device 10B according to this modification, it is possible to obtain the same operation and effect as the transflective type liquid crystal display device 10A according to the above embodiment.

Modification 2

The trenches 22a and 22b formed in the multi-gap layer 20 have inclined portions (sidewalls) thereof having an inclination angle of preferably 60 to 85 degree with respect to the transparent substrate 18. When the inclination angle of the inclined portions of the trenches 22a and 22b formed in the multi-gap layer 20 with respect to the transparent substrate 18 is equal to or smaller than 60 degree, the area of an alignment disorder region increases, and thus, it is not desirable. When the inclination angle is greater than 85 degree, the material for alignment film becomes hard to flow therein.

Figure 5:
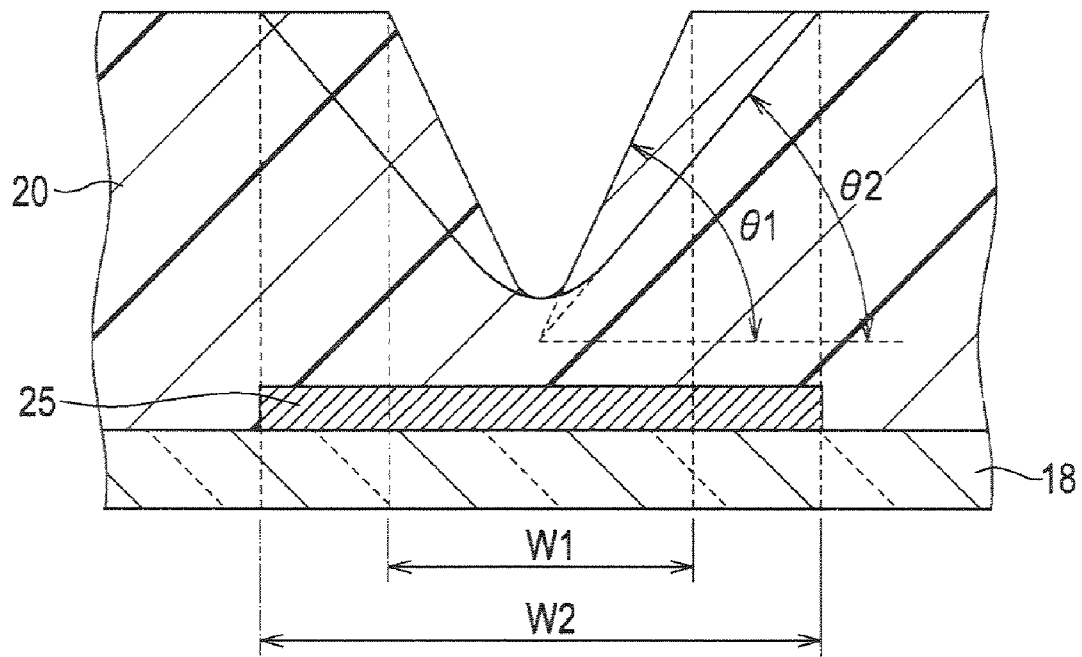
FIG. 5 is a cross-sectional view of the portion corresponding to FIG. 4A for explaining the relationship between an inclination angle and a light shielding width of an inclined surface of a trench according to Modification 2.

FIG. 5 is a cross-sectional view of the portion corresponding to FIG. 4A, for explaining the relationship between an inclination angle and a light shielding width of an inclined surface of a trench. For example, as illustrated in FIG. 5, when a width of a portion of the light shielding film 25 to be shielded, corresponding to an inclined portion of the trench having a larger inclination angle (θ1) with respect to the transparent substrate 18 is defined as W1 and a width of a portion of the light shielding film 25 to be shielded, corresponding to an inclined portion of the trench having a smaller inclination angle (θ2) is defined as W2, a relationship of W1<W2 is always satisfied. Therefore, particularly, when the inclination angle is increased close to 85 degree, the area in plan view of the inclined portions of the trenches 22a and 22b is relatively decreased. Thus, the area of a region where alignment of liquid crystal molecules is disordered is decreased, whereby the area of a disclination occurring region can be decreased. Furthermore, since the area of a region to be shielded by the light shielding film 25 is decreased, it is possible to decrease the width of the light shielding film 25, so that an aperture ratio is increased, and a liquid crystal display device having a high display luminance can be obtained. Here, it is to be noted that the light shielding film 25 between the reflective portion 15 and the transmissive portion 16 is not always necessary. In this way, the aperture ratio can be increased, and a liquid crystal display device having a high display luminance can be obtained.

Modification 3

Although the above embodiment has been described with respect to a case where the sub-pixels of colors R, G and B are arranged in a stripe form, the above embodiment is not limited to this but may employ other arrangement structures.

Figure 6:
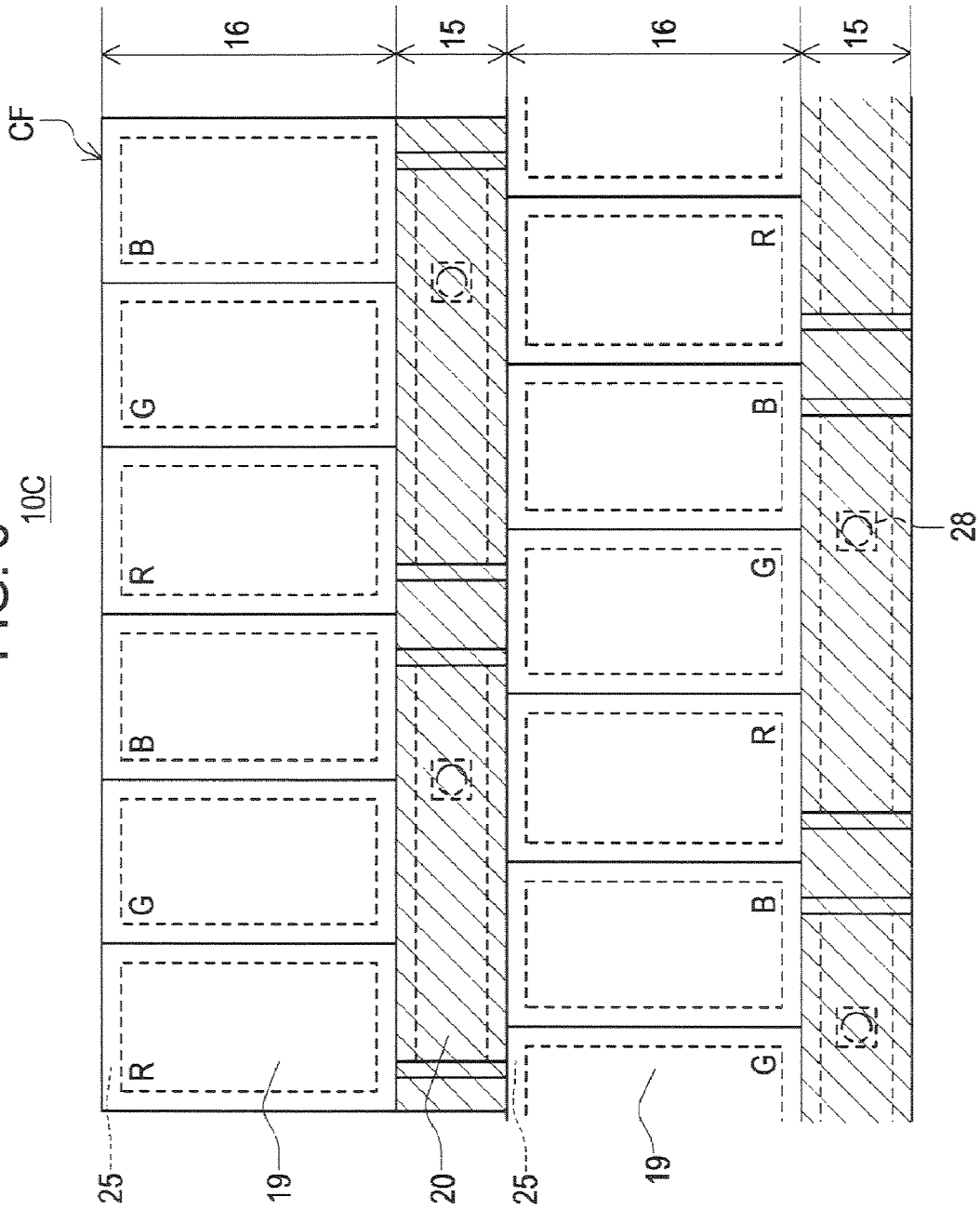
FIG. 6 is a schematic plan view of a color filter substrate of a transflective type liquid crystal display device according to Modification 3, corresponding to four pixels.

FIG. 6 is a schematic plan view of a color filter substrate of a transflective type liquid crystal display device according to this modification, corresponding to four pixels. For example, in lieu of such a strip arrangement as illustrated in FIG. 1, a delta arrangement of the transflective type liquid crystal display device 10C illustrated in FIG. 6 or a non-illustrated mosaic arrangement may be employed.

Modification 4

The color filter layers are not limited to three colors of R, G and B. More colors including the three colors are applicable. For example, the color filter layers may be formed to correspond to four colors of R, G, B and C (cyan). In this way, images can be reproduced with a larger number of colors, i.e., at least four primary colors, than the known example capable of reproducing images with three primary colors. As a result, the color gamut is increased and a liquid crystal display device having a high display luminance can be obtained.

Modification 5

The width of the trench 22a formed in the multi-gap layer 20 is larger than the width of the gap 21a of the color filter layers 19. For example, when the width of the gap 21a of the color filter layers 19 is defined as L1 and the width of the trench 22a formed in the multi-gap layer 20 is defined as L2, a relationship of L1<L2 is satisfied. It is, however, preferable that the two widths are substantially equal when the aperture ratio of the reflective portion 15 corresponding to the region of the multi-gap layer 20 is considered.

Second Embodiment

The first embodiment employs a transflective type liquid crystal display device configured to perform color display in a transmissive display mode and monochromatic display in a reflective display mode. To the contrary, this embodiment is different from the first embodiment in that it employs a transflective type liquid crystal display device configured to perform color display in both transmissive display mode and reflective display mode. This embodiment will be described in detail with reference to the drawings. Description of the same elements and the like as those of the first embodiment will be omitted or simplified.

Figure 7:
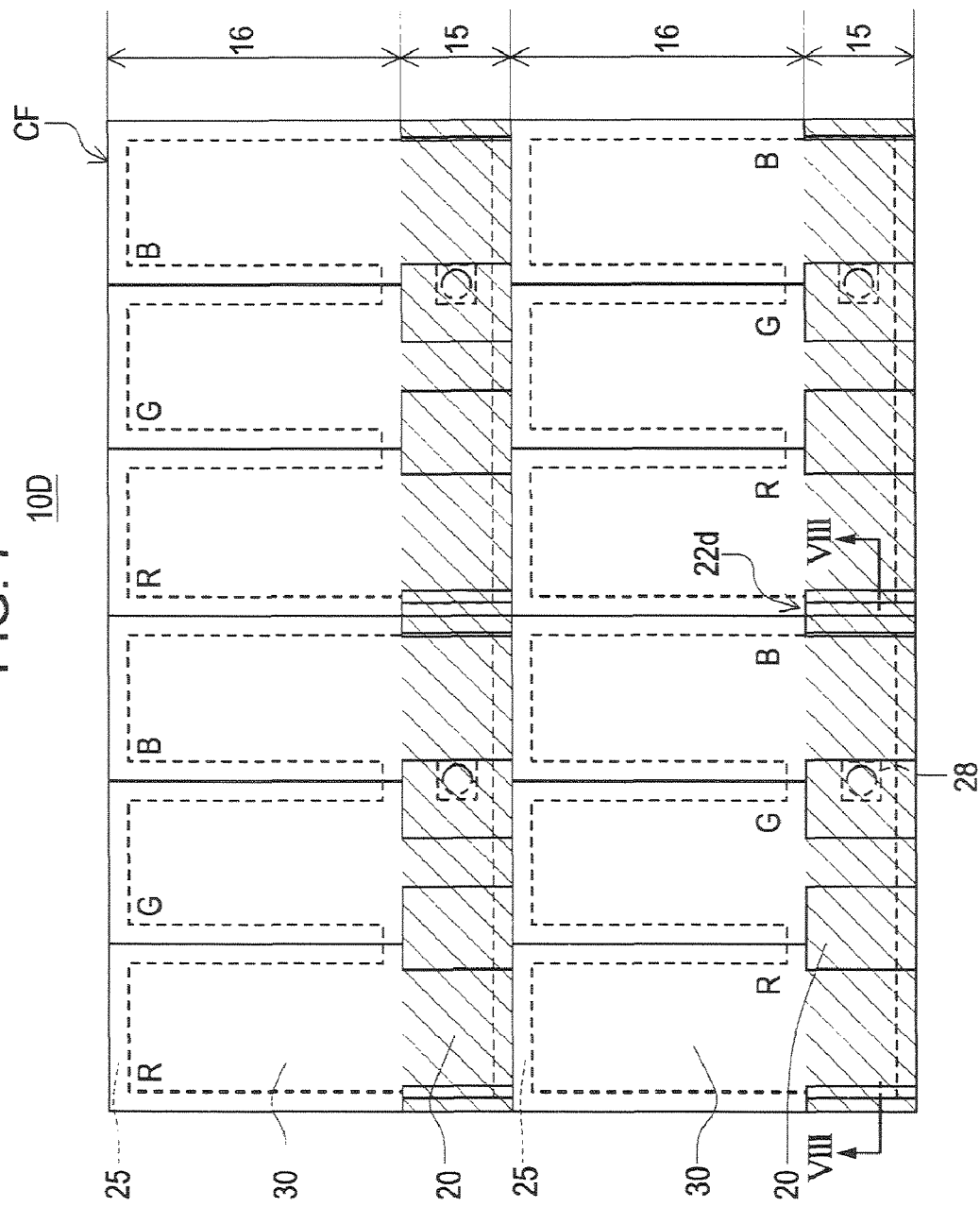
FIG. 7 is a schematic plan view of a color filter substrate of a transflective type liquid crystal display device according to a second embodiment, corresponding to four pixels.
Figure 8:
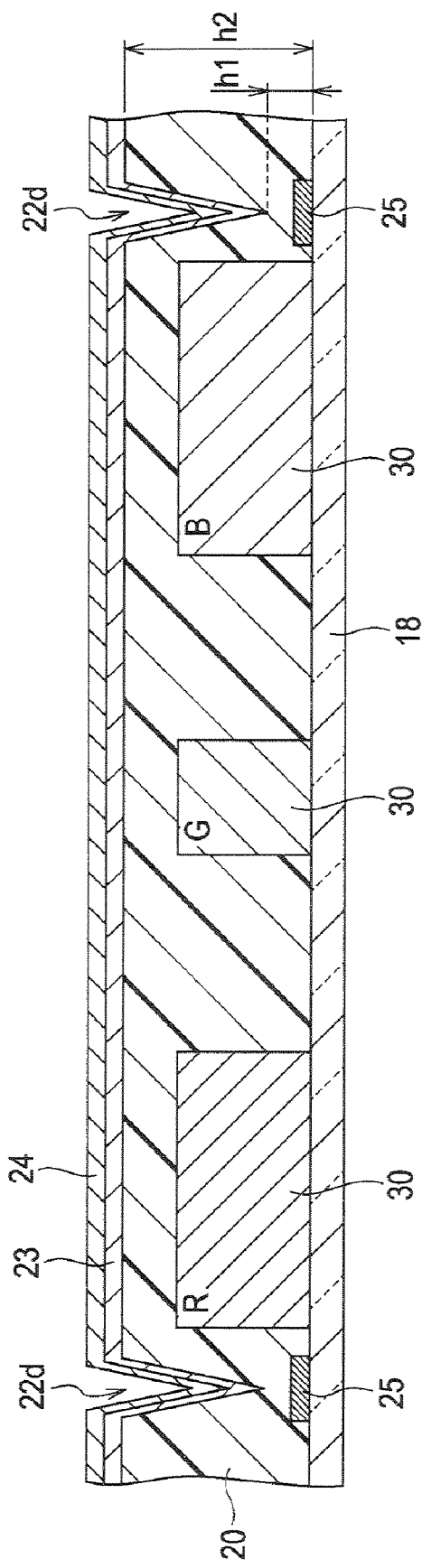
FIG. 8 is a cross-sectional view taken along the line VIII-VIII in FIG. 7.

FIG. 7 is a schematic plan view of a color filter substrate of a transflective type liquid crystal display device according to this embodiment, corresponding to four pixels. FIG. 8 is a cross-sectional view taken along the line VIII-VIII in FIG. 7.

As illustrated in FIGS. 7 and 8, in a color filter substrate CF of a transflective type liquid crystal display device 10D according to this embodiment, a reflective portion 15 having therein respective color filter layers 30 corresponding to colors R, G and B arranged in a stripe form and a transmissive portion 16 having therein respective color filter layers 30 corresponding to colors R, G and B arranged in a stripe form are arranged in a matrix form. In the transflective type liquid crystal display device 10D, among colored layers of colors R, G and B constituting the color filter layers 30 of the reflective portion 15, a region having no coloring material (non-colored region) is provided within at least one colored layer. In a transmissive type liquid crystal display device employing such a configuration, for example, by allowing the size of the non-colored regions in the respective colored layers of colors R, G and B to be different depending on the spectral characteristics of backlights, it is possible to control color balance. For example, by leaving 70 percent of the colored region for R, 30 percent of the colored region for G, and 75 percent of the colored region for B, it is possible to control color balance. When the above configuration is applied to a transflective type liquid crystal display device, by providing the non-colored region in a reflective display region where light passes across the colored layer twice, for example, it is possible to decrease a difference in contrast of colors between reflective display mode and transmissive display mode. In the case of the transflective type liquid crystal display device 10D according to this embodiment, it is possible to obtain the same operation and effect as the transflective type liquid crystal display device 10A according to the above embodiment.

While the above embodiments have been described with respect to the examples of a transflective type liquid crystal display device configured to perform color display n a transmissive display mode and monochromatic display in a reflective display mode and a transflective type liquid crystal display device configured to perform color display in both transmissive display mode and reflective display mode, the invention can be applied to a transmissive type liquid crystal display device as long as a multi-gap layer and steps or inclined portions formed by the multi-gap layer exist.

What is claimed is:

1. A liquid crystal display device, comprising:
a substrate having a pixel electrode; and
a color filter substrate having a color filter layer on a transparent substrate while having an alignment film formed as an uppermost layer thereof, a display region having a plurality of sub-pixels formed thereon, wherein:
the color filter substrate has a liquid crystal layer thickness-adjustment layer formed of a transparent resin layer being partially formed so as to overlap with the plurality of sub-pixels; and
the liquid crystal layer thickness-adjustment layer has a trench being formed along and between adjacent ones of the sub-pixels, the bottom of the trench of the liquid crystal layer thickness-adjustment layer being lower than a height of the color filter layer from a surface of the transparent substrate, and the transparent resin layer existing on the bottom of the trench.

2. The liquid crystal display device according to claim 1, wherein the bottom of the trench of the liquid crystal layer thickness-adjustment layer is partly flat.

3. The liquid crystal display device according to claim 1, wherein the sub-pixels has a color filter layer of different color in each sub-pixel, and the color filter layer has a predetermined gap between each sub-pixel, wherein the width of the trench is larger than the width of the gap.

4. The liquid crystal display device according to claim 1, wherein the color filter substrate has a light shielding film being formed so as to overlap with the trench formed in the liquid crystal layer thickness-adjustment layer in plan view.

5. The liquid crystal display device according to claim 2, wherein the trench formed in the liquid crystal layer thickness-adjustment layer has a width smaller than that of the light shielding film.

6. The liquid crystal display device according to claim 1, further comprising a plurality of pixels each being formed of the plurality of sub-pixels, wherein the trench formed in the liquid crystal layer thickness-adjustment layer is formed for each of the pixels.

7. The liquid crystal display device according to claim 1, wherein the trench formed in the liquid crystal layer thickness-adjustment layer has sidewalls and an inclination angle of the sidewalls being between 60 and 85 degree with respect to the transparent substrate.

8. The liquid crystal display device according to claim 1, wherein in each sub-pixel, the color filter layer is not disposed only in a part of the region where the liquid crystal layer thickness-adjustment layer is formed.

9. The liquid crystal display device according to claim 1, wherein in each sub-pixel, the color filter layer is not disposed over the entire of the region where the liquid crystal layer thickness-adjustment layer is formed.

10. The liquid crystal display device according to claim 1, wherein each of the plurality of sub-pixels includes a reflective region and a transmissive region, and the liquid crystal layer thickness-adjustment layer is formed in the reflective region.

* * * * *